US006833023B1

United States Patent
Vandenberghe et al.

(10) Patent No.: US 6,833,023 B1
(45) Date of Patent: Dec. 21, 2004

(54) AIR FILTER ASSEMBLY (75) Inventors: Philippe Vandenberghe, Rueil Malmaison (FR); Laurent Guimond, Glatigny (FR)

(73) Assignee: International Liner Co., Inc., Mt. Braddock, PA (US)

( * ) Notice: Subject to any disclaimer, the term of this patent is extended or adjusted under 35 U.S.C. 154(b) by 62 days.

(21) Appl. No.: 10/367,473

(22) Filed: Feb. 14, 2003

(51) Int. Cl.$^7$ .................. B01D 27/06; B01D 27/08
(52) U.S. Cl. ................. 95/268; 55/337; 55/498; 55/503; 55/505; 55/507; 55/521
(58) Field of Search .................. 55/337, 385.3, 55/457, 498, 503, 505, 507, 521; 95/268

(56) References Cited

U.S. PATENT DOCUMENTS

| 4,157,902 A | 6/1979 | Tokar .................. 55/385 |
| 5,549,722 A | 8/1996 | Zemaitis et al. .......... 55/463 |
| 5,685,887 A | 11/1997 | Mochida ................ 55/336 |
| 5,902,365 A | 5/1999 | Haggard ................ 55/498 |
| 5,972,059 A | 10/1999 | Morgan ................. 55/336 |
| D428,128 S | 7/2000 | Gillingham et al. ....... D23/265 |
| 6,258,144 B1 | 7/2001 | Huang .................. 55/385.3 |
| 6,319,298 B1 * | 11/2001 | Ng-Gee-Quan .......... 55/331 |
| 2001/0049925 A1 | 12/2001 | Quan ................... 55/337 |
| 2002/0040569 A1 | 4/2002 | Reinhold ............... 55/498 |

FOREIGN PATENT DOCUMENTS

GB          2 064 359        6/1981

* cited by examiner

Primary Examiner—Robert A. Hopkins
(74) Attorney, Agent, or Firm—Price & Adams (57) ABSTRACT

A filter assembly includes a conical filter element sealingly clamped to a cylindrical base. A conical housing is releasably clamped to the base with spring clips in surrounding relation with the filter element to allow for efficient installation and removal of the filter element in the housing. The filter element includes a cap having a plurality of integral turbine blades forming a plurality of channels angularly displaced from the longitudinal axis of the filter element. The channels accelerate the flow of air into the filter assembly and through the filter element. The filter element is mounted on the base to dampen vibration and abate the resultant noise generated by the flow of air through the filter assembly.

25 Claims, 7 Drawing Sheets

AIR FILTER ASSEMBLY

BACKGROUND OF THE INVENTION

1. Field of the Invention

This invention relates to an improved air filter assembly, and more particularly, to an air filter assembly that is efficiently installed and replaced, providing a more effective method for removing contaminants from air.

2. Description of the Prior Art

Filter assemblies are conventionally used within automobile air filtration systems. A typical automotive air filter assembly includes a conical filter element, as disclosed in U.S. Design Pat. No. 428,128.

Another example of a conical filter element used in an automotive air cleaner unit is disclosed in U.S. Pat. No. 5,685,887. The filter element includes a corrugated filter surface having a plurality of pleats forming rows of hills and valleys slantwise on a corrugated sectional surface. The pleats are angled tangentially relative to a longitudinal axis of the filter element.

Filter elements are typically used within tubular housings or shells. U.S. Pat. No. 6,258,144 discloses a filter element for an engine that includes two conical netted filter members mounted within a tubular member.

U.S. Patent Application Publication No. 2002/0040569 discloses a filter assembly for the intake air of an internal combustion engine that includes a conical filter element mounted within a two-piece shell. The two shell pieces are joined by a groove and collar connection. The shell has two openings, an inlet and an outlet. The inlet is positioned offset from a central axis of the housing shell and directs air to one side of the filter element. The outlet is positioned to receive filtered air from the filter element along a central axis of the shell.

U.S. Pat. No. 5,902,365 discloses for an internal combustion engine a filter assembly having a tubular housing and a frusto-conical filter element. The frusto-conical filter element includes a nose plug, a filter, and a base ring. The filter includes a sheet of filter media pleated and folded to form a frusto-conical shape. The pleats extend along an elongated surface of the filter element from the nose plug to the base ring. The filter element is positioned within a housing by inserting a circumferential lip on the base ring into a circumferential recess of the housing.

U.K. Patent Application GB 2 064 359 discloses a two component filter unit for an internal combustion engine air intake. The filter unit includes a cylindrical body member and a frusto-conical filter element. A top portion of the frusto-conical filter element is dimensioned such that the cross-sectional area of the airflow passage between its minimum diameter and the inner-cylindrical surface of the body is equal to the cross-sectional area defined by a tubular member. The cross-sectional area of the airflow passage between its minimum diameter and the inner-cylindrical surface of the body is also equal to the cross-sectional area of the flow passage designed by the baffle.

U.S. Pat. No. 5,972,059 discloses a filter assembly for use in a dust collecting system. The filter assembly includes a cylindrical housing and a pleated conical filter element. The filter element is inverted to receive contaminated air through the base. The air passes through the filter and flows by the apex to an outlet in the housing. A brace is attached to the apex of the conical filter element to hold the filter element in place. The brace includes a cap having a smooth aerodynamic shape.

Other air filter elements having smooth aerodynamic conical shapes are known in the art. U.S. Pat. No. 4,157,902 discloses an air cleaner designed for insertion in the air intake conduits of over-the-road vehicles. The air cleaner includes a tubular housing and a conical member. The member includes a section covered by pleated paper to form a filter element. The member includes a conical cap section having a smooth aerodynamic shape. The member is attached to the housing with a plurality of bolts.

U.S. Pat. No. 5,549,722 discloses a filter assembly having a filter housing, a frustoconical filter element, and a base. The frustoconical filter element includes a cone diffuser having a smooth aerodynamic shape. The base includes a flange. The filter housing is clamped to the flange on the base portion.

U.S. Pat. No. 6,319,298 discloses a two component filter system having a non-metallic housing that functions as a heat shield and an air filter element. The air filter element includes a dome shaped cap supported by a truncated cone shaped filter element. The heat shield is mounted on a clamp and surrounds the air filter element. The heat shield is made of a low heat conducting material, such as high impact plastic.

The geometry of the housing and the filter element are often important factors in the design of an air filter assembly. Accordingly, there is need for an air filter assembly that distributes the flow of air evenly across the surface of the filter element. A housing designed to position a filter cap to accelerate the flow of contaminated air through the filter assembly is also desirable.

The attachment of the housing in surrounding relation to the filter element is another important factor in the design of a filter assembly. The housing should be positioned relative to the filter element to optimize the flow of air through the filter element to improve filter efficiency. The housing should be connected to the filter element to facilitate ease in installation and replacement of the filter in the housing. Accordingly, there is a need for an air filter assembly having a housing efficiently connected to the filter element for promoting uniform flow of air into and surrounding the filter element.

SUMMARY OF THE INVENTION

In accordance with the present invention there is provided an improved air filter that includes a filter element formed of an air permeable material. The filter element has a conical-shaped body portion with an open upper end portion and an open lower end portion. The open upper end portion has a smaller diameter than the diameter of the open lower end portion. A cap is positioned in the filter element open upper end portion to close the open upper end portion. The cap has a conical configuration with a plurality of turbine blades extending in spaced relation on the surface of the cap to form channels between the turbine blades. The channels accelerate the flow of contaminated air between the turbine blades into the filter element. A cylindrical base has an open enlarged end portion and an open reduced end portion coaxially aligned with and extending from the open enlarged end portion. The base open enlarged end portion extends into said filter element open lower end portion to support the filter element on the base. A clamping mechanism circumscribes the filter element lower open end portion in surrounding relation with the base open enlarged end portion for connecting the filter element to the base to form an outlet for directing the accelerated flow of air free of contaminants out of the filter element.

Further in accordance with the present invention, there is provided an air filter assembly that includes a filter element formed of an air permeable material. The filter element has a conical-shaped body portion with an upper end portion closed by a cap and an open lower end portion. A resilient collar extends axially from the filter element open lower end portion. A cylindrical base member has an inlet end portion and an outlet end portion with a radial portion positioned intermediate the inlet and outlet end portions. The base member inlet end portion extends into sealing engagement with said collar to axially position the filter element on the base member. A housing surrounds the filter element and has a cylindrical open upper end portion and an elongated frusto-conical body portion. The housing body portion has a lower end positioned on the base member radial portion to axially position the housing on the base member and thereby coaxially align the housing and the filter element to assure uniform spacing between the housing and the filter element the length of the filter element in the housing for the flow of air into the housing and through the filter element.

Further in accordance with the present invention, there is provided a method for assembling an air filter that includes the step of supporting a lower end portion of a conical filter element on a cylindrical base. The filter element is clamped to the base to maintain the filter element in axial alignment with the base. A conical housing having opposite open end portions is positioned in surrounding relation with the filter element. A large diameter end portion of the housing is positioned on the base in surrounding relation with the filter element secured to the base. The housing is secured to the base so that the housing is axially aligned with the base to coaxially position the housing and the filter element to maintain uniform spacing between the housing and the filter element for the flow of air into the housing and through the filter.

Accordingly, a principal object of the present invention is to provide an air filter assembly including a base that releasably attaches to a tubular housing for ease of installation and replacement of an air filter element.

Another object of the present invention is to provide an air filter assembly having a cap with a plurality of turbine blades that distribute contaminated air evenly across the filter surface by creating a swirling effect within a housing.

A further object of the present invention is to provide a tubular housing that accelerates the flow of contaminated air within an air filter assembly providing a more efficient filtering system.

A further object of the present invention is to provide a tubular housing and base that are positioned relative to one another to accelerate the flow of contaminated air while achieving an even flow of contaminated air across the surface of the filter element.

A further object of the present invention is to provide an air filter element that includes a resilient collar that is tightly clamped to a rigid base to dampen the vibration of the filter element as air flows through the filter element.

These and other objects of the present invention will be more completely described and disclosed in the following specification, accompanying drawings, and appended claims.

DESCRIPTION OF THE PREFERRED EMBODIMENTS

Figures 1, 2:
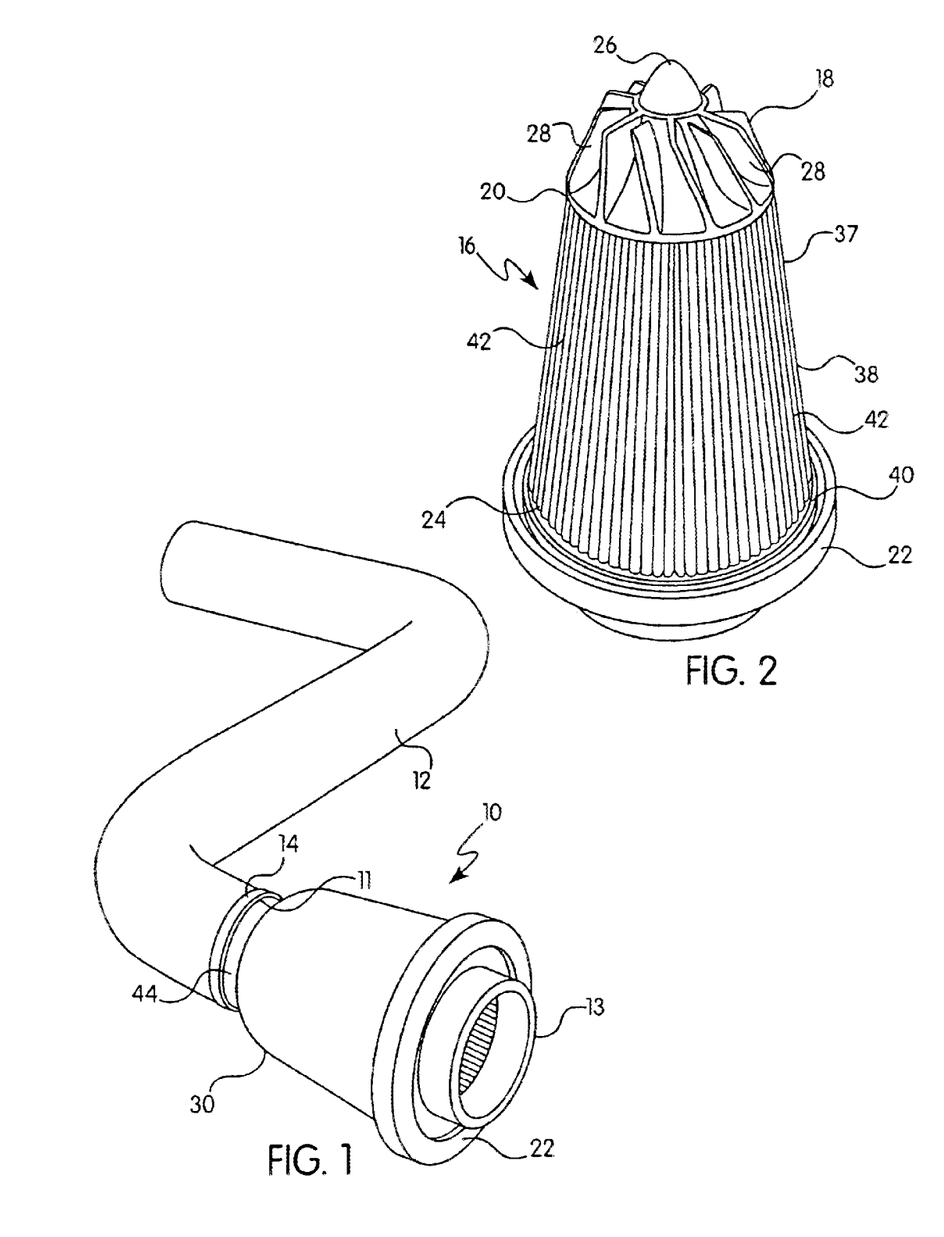
FIG. 1 is an isometric view of an air filter assembly, illustrating the air filter assembly attached to a duct.
FIG. 2 is an isometric view of a replaceable air filter element for the air filter assembly shown in FIG. 1.

Referring to the drawings and, particularly, to FIG. 1, there is illustrated an air filter assembly generally designated by the numeral 10, particularly adapted for use in an automobile air filtration system. An air intake end 11 of the filter assembly attaches to a flexible hose or duct 12 for receiving contaminated air to be filtered. An air outlet end 13 of the filter assembly 10 attaches to a duct (not shown) for conveying the filtered air to an internal combustion engine. The duct 12 attaches to the filter assembly 10 through a conventional connecting mechanism, such as a hose clamp 14.

Figure 8:
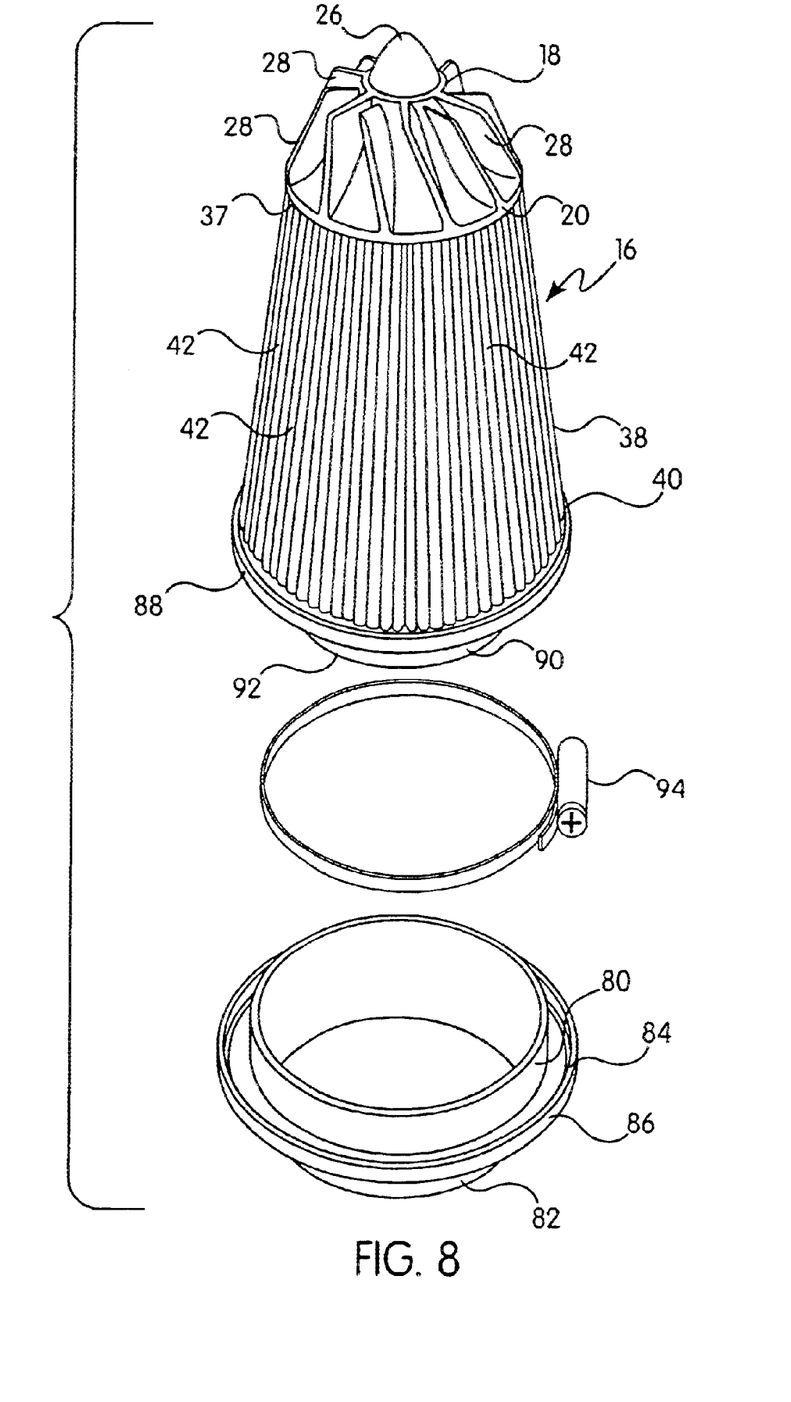
FIG. 8 is an exploded isometric view of the air filter element, illustrating a hose clamp for connecting the filter element to the base.

Referring now to FIGS. 1–6, the filter assembly 10 includes a frustoconical filter element 16 having a conical cap 18 which is sealingly attached to an inlet end 20 of the filter element 16. The filter 16 is supported by a base 22 which is attached to an outlet end 24 of the filter element 16. As shown in FIGS. 2 and 8, the cap 18 includes a conical nose 26 and a plurality of integral extensions which form turbine blades 28. The turbine blades 28 extend angularly relative to the longitudinal axis of the filter element 16 in a spaced relation on the surface of the cap 18 to form a plurality of channels between the blades 28.

Figure 3:
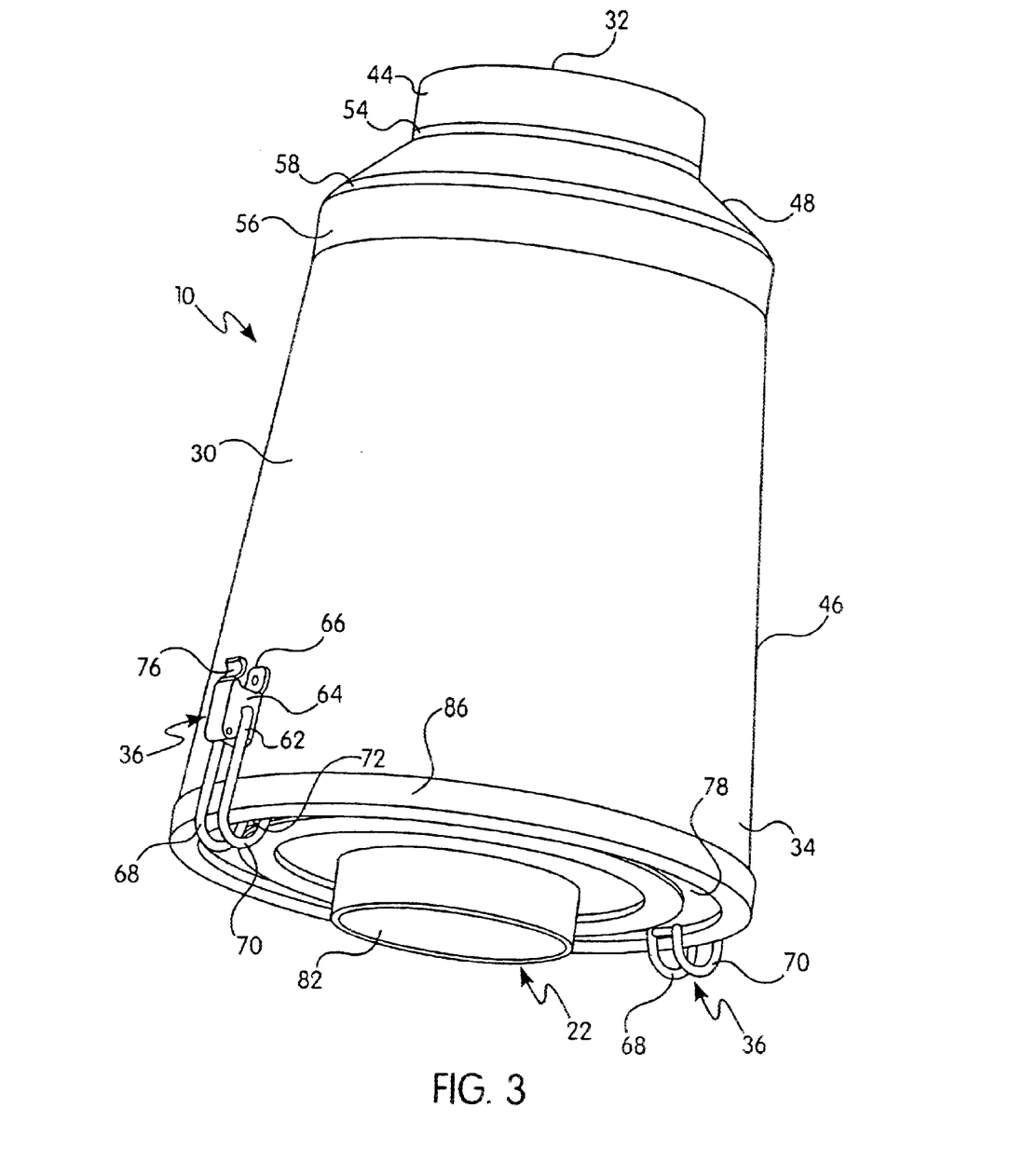
FIG. 3 is an isometric view of the air filter assembly shown in FIG. 1, illustrating the mechanism for clamping the housing to the air filter element.
Figure 4:
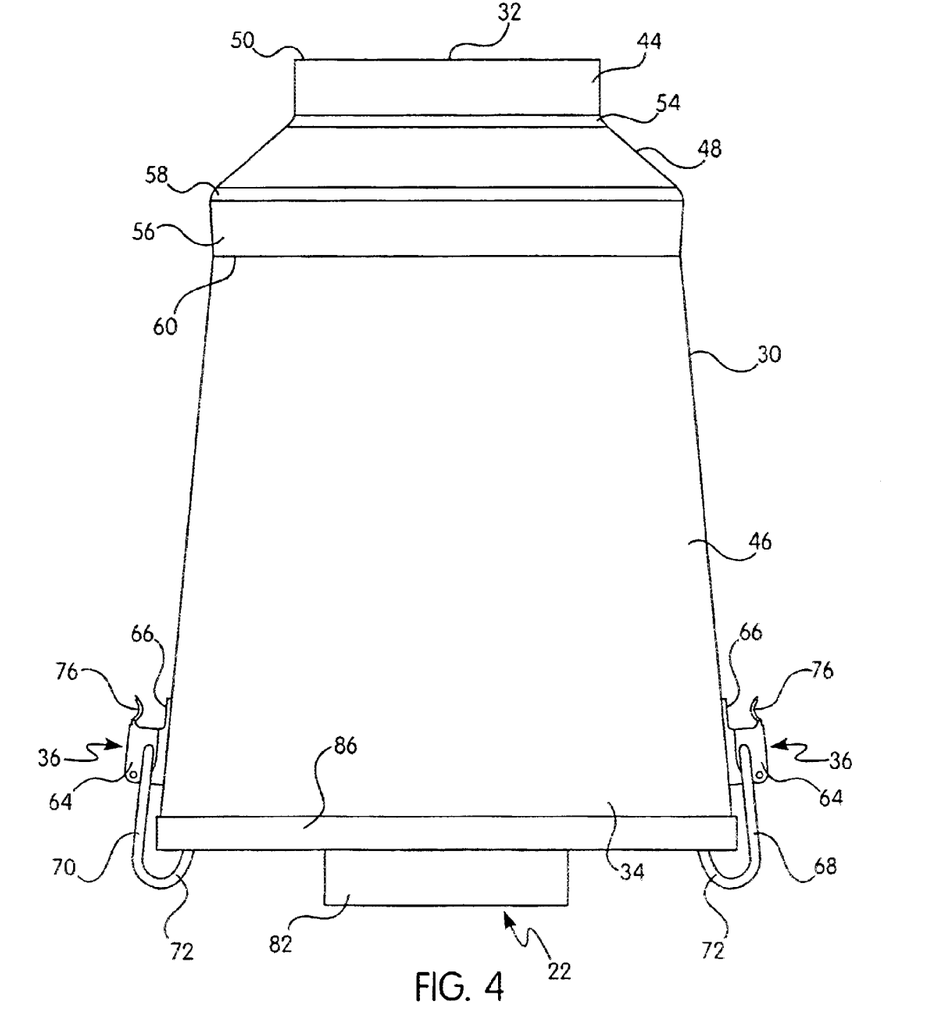
FIG. 4 is a view in side elevation of the air filter assembly shown in FIG. 3.
Figure 5:
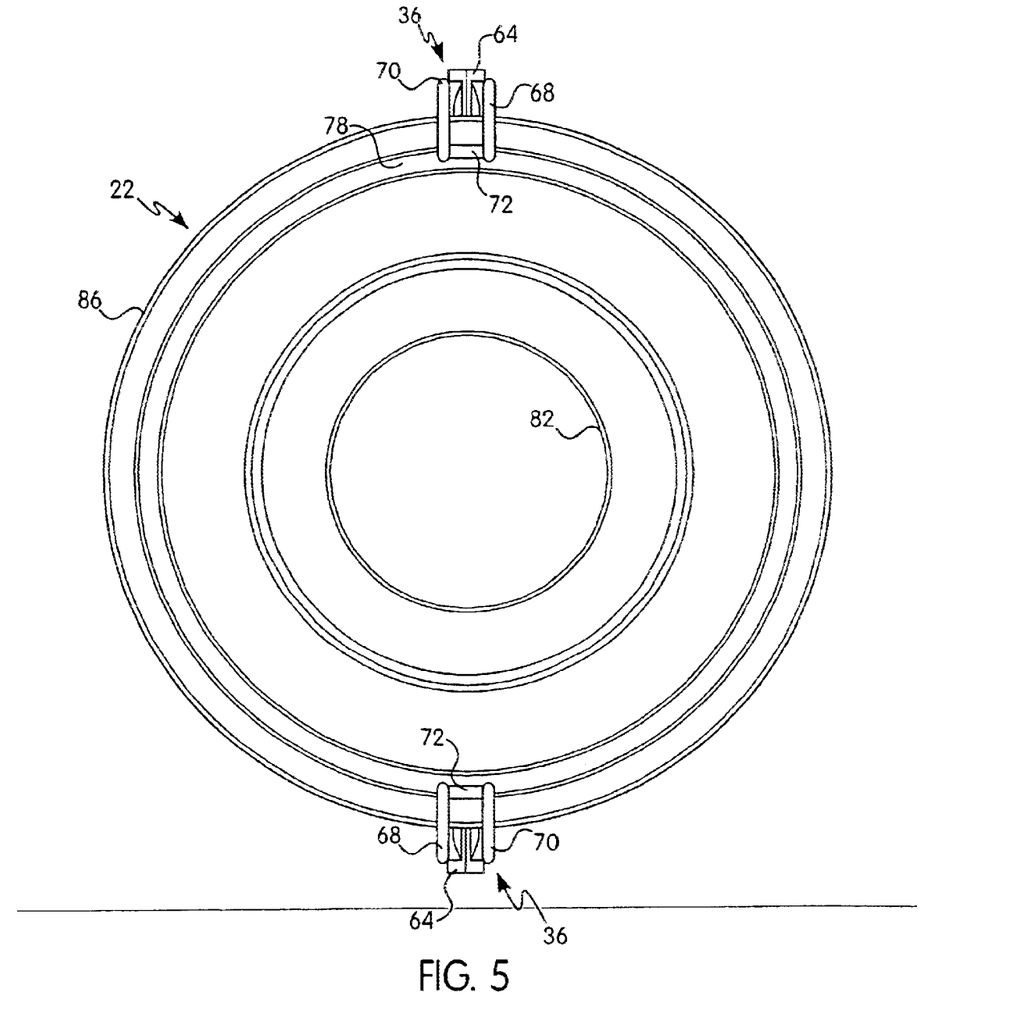
FIG. 5 is a bottom view of the air filter assembly shown in FIG. 4.
Figure 6:
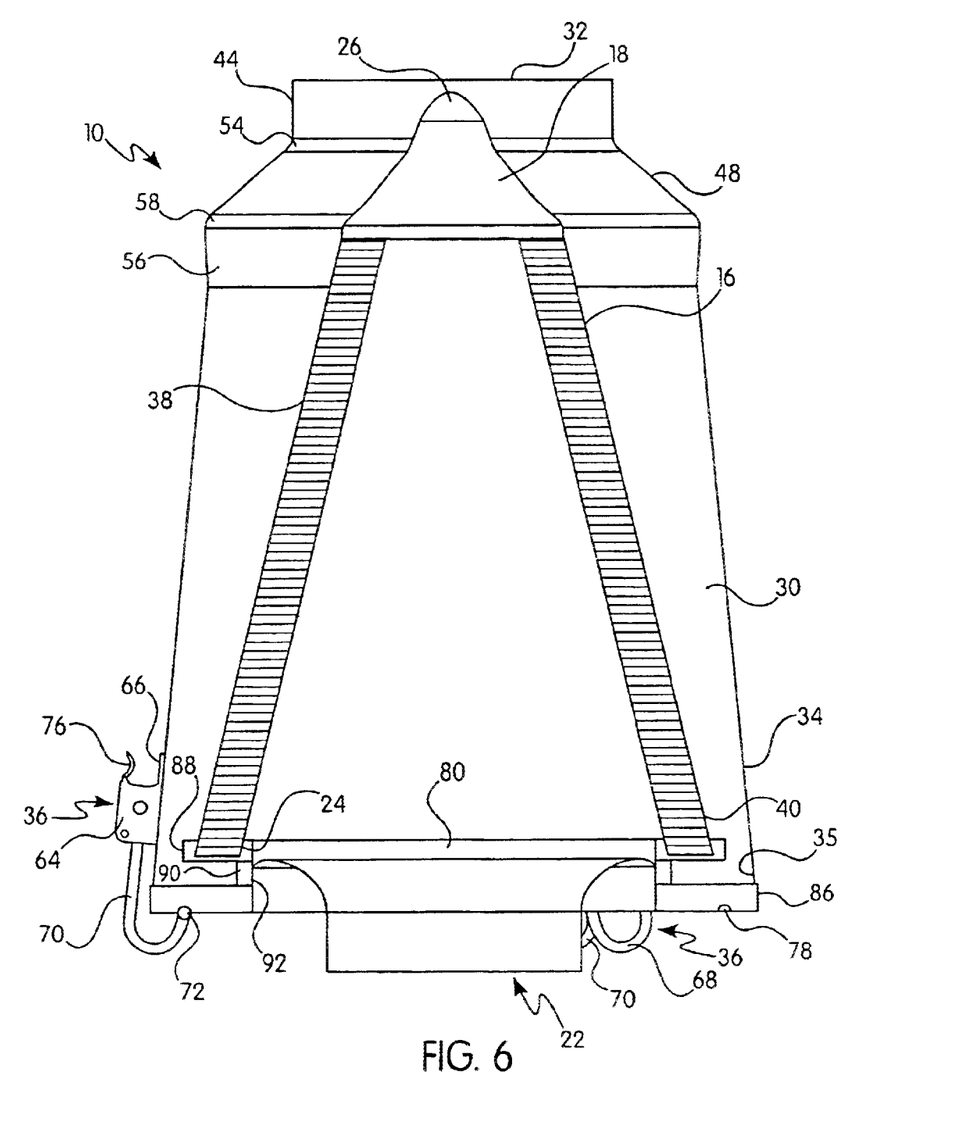
FIG. 6 is a partial sectional view in side elevation of the air filter assembly, illustrating the filter element positioned in the housing.

As shown in FIGS. 3, 4, and 6, a cylindrical housing 30 surrounds the filter element 16 and cap 18 to direct the flow of air from an inlet opening 32 into the housing 30 and through the filter element 16. The base 22 supports a lower end portion 34 of the housing 30 to position the housing 30 relative to the filter element 16 to maximize the flow of air through the filter element and out outlet opening 35 of the housing 30. The base 22 also positions the housing 30 relative to the filter element 16 and cap 18 to evenly distribute the flow of air across the surface of the filter element 16 and through the filter element to outlet opening 35.

A fastening mechanism, such as a spring clip, generally designated by the numeral 36 releasably attaches the cylindrical housing 30 to the base 22. The fastening mechanism 36 engages and disengages the housing 30 to the base 22 to permit ease of access to the filter element 16. This facilitates efficient installation and removal of the filter element 16 from the housing 30 and base 22 to allow for cleaning or replacement of the filter element.

As shown in FIGS. 2 and 8, the filter element 16 includes an upper end portion 37 closed by cap 18, a filter surface 38 and a lower end portion 40. The filter surface 38 is formed from a deep pleated, double layered sheet of woven material supported by a strong, fine wire mesh (not shown). The wire mesh engages the cap 20 and filter lower end portion 40. The filter surface 38 exhibits a corrugated sectional-shape formed by spaced apart rows 42 or hills between valleys which increase the filter surface area. The rows 42 extend longitudinally from the cap 18 to the end portion 40. In one embodiment, the rows 42 of deep pleats provide a 10–20% increase in the area of the filter surface 38.

Referring to FIGS. 3 and 4, the cylindrical housing 30 includes an upper section 44, a conical lower section 46, and a transition section 48. The upper section 44 is tubular in shape and includes the opening 32. As shown in FIG. 1, the upper section 44 connects to the air intake duct 12 to receive and direct contaminated, unfiltered air to the filter element 16. Preferably, the upper section 44 maintains an essentially constant diameter along its length from where it attaches to the duct 12 to where it attaches to the transition section 48.

The transition section 48 includes an upper end portion 54 and a lower end portion 56 connected by an intermediate portion 58. In the preferred embodiment, the upper end portion 54 is a tubular, truncated cone and the lower portion 56 is cylindrical in shape. The lower end portion 56 is connected to the upper end portion 54 by the intermediate portion 58 of the transition section 48.

The housing lower section 46 increases in diameter along its length from an upper end 60 to the lower end portion 34 of housing 30 to form a truncated cone. The lower end portion 34 is supported by the base 22, as shown in FIG. 6. The nose 26 of the filter cap 18 projects into the housing upper section 44 with the cap turbine blades 28 positioned within the housing transition section 48. The filter lower end portion 40 is clamped to the base 22 in the housing lower end portion 34. The base 22 projects out of the housing outlet opening 35.

The housing 30 is formed from a material, such as a metal, a ceramic, a plastic, or a composite thereof, capable of withstanding the environmental conditions of an internal combustion engine, such as high temperatures. The method for fabricating the housing 30 is not critical. In one example, the housing 30 is made from metal through conventional fabrication methods.

The spring clip-type fastening mechanism 36, shown in FIGS. 3, 4, and 6 includes a clip portion 62, a locking member 64, and a bracket 66. The clip portion 62 includes a member folded over itself to form a pair of J-shaped arms 68, 70. The arms 68, 70 are attached by a connecting portion to form a hook or clasp 72. One end of each arm 68, 70 is inserted into a hole in the locking member 64 to attach the clip portion 62 to the locking member 64. The locking member 64 attaches to the bracket 66, which is mounted on the lower section 46 of the housing 30. The bracket 66 includes a conventional spring tension locking device (not shown) which causes the spring clip 36 to lock and unlock as necessary. The bracket 66 is mounted on the lower section 46 through conventional fastening means, such as screws, bolts, rivets and the like. An identical spring clip 36 is mounted on the opposite side of the housing lower section 46.

The spring clip 36 is actuated to releasably attach the base 22 to the lower section 46 of the housing 30 by pivoting an integral handle 76 on the locking member 64. The handle 76 causes the locking member 64 to pivot relative to the bracket 66 to lock and release the hook 72 as necessary. The hook 72 extends into a recess 78 (FIG. 6) in the base 22 to frictionally engage the base 22 and thereby, releasably attach the housing 30 to the base 22.

As seen in FIG. 2, the channels between the turbine blades 28 of the filter cap 18 and the rows of pleats 42 on the filter surface 38 are misaligned to cause a unique air flow pattern. The cap channels are angularly displaced from a longitudinal axis of the cap 18. Consequently, as the flow of air is directed between the turbine blades 28 it follows a spiral path out of the channels into the filter 16. The flow of contaminated air is also accelerated on the surface of the cap 18 by the reduced cross sectional area within the housing 30 at the transition section 48. The angular displacement of the cap blades 28 creates a swirling effect to evenly distribute the flow of contaminated air across the surface 38 of the filter 16.

Figure 7:
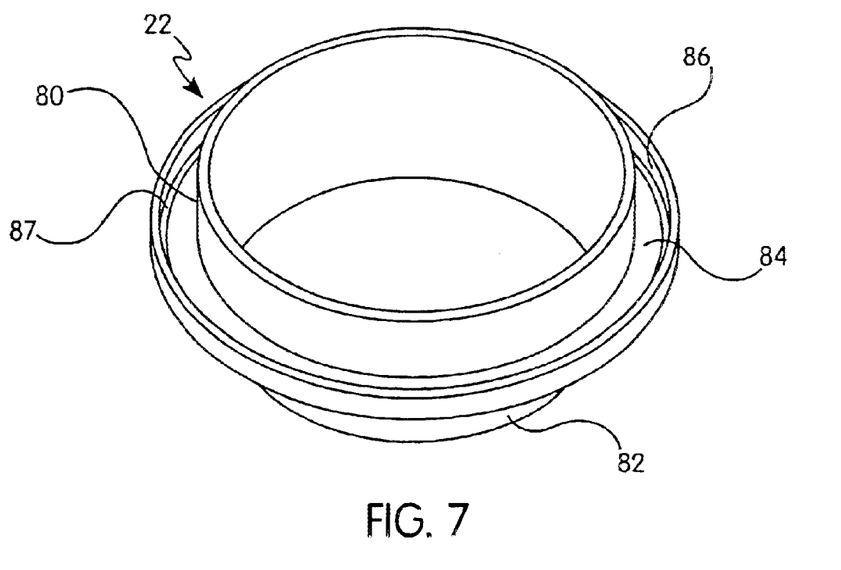
FIG. 7 is an isometric view of the base of the air filter assembly.

Referring to FIG. 7, the base 22 has a tubular shape formed by an enlarged open end portion 80 and a reduced open end portion 82 separated by a flange 84. The flange 84 extends radially on the base 22 between the end portions 80 and 82. The flange 84 includes a peripheral edge 86 with a recess 87 (FIG. 7) adjacent thereto. The recess 87 receives the housing lower end portion 34. The edge 86 supports the housing 30 in the recess 87 in a position on the base where the housing 30 is coaxial with the base 22. The filter element 16 is also coaxially mounted on the base 22. Consequently, the housing 30 is maintained in coaxial alignment with the filter element 16. This coaxial relationship is maintained after each exchange of filter element 16 in the filter assembly 10.

As shown in FIGS. 6 and 8, the filter element 16 is releasably clamped to the base 22. The base enlarged end portion 80 is an annular ring that extends into frictional engagement with the outlet end 24 of the filter element 16. The filter element outlet end portion 24 includes a resilient annular flange 88 with an integral collar 90. The flange 88 is an integral part of the filter element 16 for connecting the outlet end 24 of the filter element to the base 22. The collar 90 includes an opening 92 for receiving the base enlarged end portion 80 to attach the filter element 16 to the base 22. A clamping mechanism, such as a hose clamp 94 shown in FIG. 8, circumscribes the resilient collar 90 extending from the end of the filter element 16 with the base end portion 80 extending into the collar 90.

Tightening the hose clamp 94 compresses the resilient collar 90 into sealing engagement with the base end portion 80. In this manner the filter element 16 is clamped to the base 22. When the filter element 16 is clamped to the base 22, the filter element 16 is coaxially positioned on the base 22. Thereafter, the housing 30 is positioned in the recess 87 on the base 22 adjacent to the edge 86 and locked in place by the fastening mechanisms 36. In this manner the housing 30 is coaxially mounted on the base 22 in coaxial alignment with the filter element 16.

By coaxially mounting the filter element 16 and the housing 30 on the base 22, the filter element 16 and the housing 30 are positioned to assure uniform spacing between the filter surface 38 and the inner surface of the housing 30, as shown in FIG. 6. When required to clean or replace the filter element 16 in the housing 30, the housing is easily released from connection to the base 22 to provide access to the filter element 16 for removal from the base 22. When the filter element 16 is returned to service in the assembly 10, the above described operation of connecting the filter element 16 and housing 30 to the base 22 assures coaxial alignment of the filter element and housing. No adjustments are required after the filter element 16 is connected to the base 22 and the housing 30 is connected to the base 22.

As shown in FIGS. 2 and 8, the cap 20 and flange 88 are integral components of the filter element 16. In one embodiment, the cap 20 and flange 88 with collar 90 are fabricated of a resilient material, such as a molded flexible rubber. The rubber provides resiliency, which allows the collar 90 to sealingly engage the base 22 under the compressive force of the hose clamp 94. Thus an airtight connection is provided between the base 22 and the filter element 16. The resilient characteristics of the flange 88 and collar 90 also serve to dampen vibration of the base 22 and attenuate resultant noise generated by the air flow through the filter assembly 10. The molded flexible rubber flange 88 and collar 90 serve multiple functions of providing an airtight seal, dampening vibration, and abating noise. The rubber also expands and contracts to accommodate bases of varying sizes.

In practice, the filter element 16 is removable from the housing 30 for cleaning when clogged with debris at selected time intervals. When its performance life has been expended, the filter element 16 is replaced. In accordance with the present invention the filter element 16 is quickly assembled and disassembled by attaching the flexible collar 90 to the base 22 with the hose clamp 94. The geometry of the base 22 assures that the filter element 16 is always in coaxial relation with the base 22 when it is clamped to the base. No separate alignment step is required.

Clamping the filter element 16 to the base 22 automatically places the filter element in coaxial alignment with the base 22. The base end portion 80, as shown in FIGS. 6 and 8, inserts into sealing engagement with the resilient collar 90 of the filter element 16. The seal between the base 22 and the collar 90 is completed by tightening hose clamp 94 into compressive relation with the collar 90 circumscribing the base end portion 80. With the resilient collar 90 compressed onto the base end portion 80, vibration of the housing 30 and the base 20 generated by the accelerated flow of air through the filter element is absorbed or dampened by the collar 90. Dampening of the vibration also attenuates the noise generated by operation of the filter assembly 10.

The coaxial relationship maintained between the filter element 16 and the housing 30 by the base 22 optimizes the flow of contaminated air through the filter 38. The filter element 16 efficiently slides onto the base end portion 80 and is tightened thereon by the hose clamp 94. The housing 30 is then moved into surrounding relation with the filter element 16 and on the base flange 84. The bottom edge of the housing 30 rests in the annular groove 87 on the flange 84. Positioning the housing 30 in the groove 87 on the flange 84 positions the housing 30 coaxially with the filter element 16 and the base 22. The spring clips 36 are clamped into engagement with the bottom of the base flange 22 to connect the housing 30 to the base 22. The spring clips 36 maintain the housing 30 rigidly locked to the base 22 which is rigidly clamped to the filter element 16.

The air filter surface 38 is formed from a suitable air permeable material, such as cloth, paper, unwoven cloth or the like. In one example, the filter 38 is formed from cotton, which is unaffected by different weather conditions, temperatures, humidity or moisture. The cotton filter 38 dries quickly and thoroughly when damp. The double layered woven cotton is made from a medium and a fine layer to trap and hold dirt, dust and moisture particles as small as 0.5 microns.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

We claim:

1. An air filter comprising:

a filter element formed of an air permeable material, said filter element having a conical-shaped body portion with an open upper end portion and an open lower end portion, said open upper end portion having a smaller diameter than the diameter of said open lower end portion, a cap positioned in said filter element open upper end portion to close said open upper end portion, said cap having a conical configuration with a plurality of turbine blades extending in spaced relation on the surface of said cap to form channels between said turbine blades, said channels accelerating flow of contaminated air between said turbine blades into said filter element, a cylindrical base having an open enlarged end portion and an open reduced end portion coaxially aligned with and extending from said open enlarged end portion, said base open enlarged end portion extending into said filter element open lower end portion to support said filter element on said base, and clamping means circumscribing said filter element lower open end portion in surrounding relation with said base open enlarged end portion for connecting said filter element to said base to form an outlet for directing the accelerated flow of air free of contaminants out of said filter element.

2. An air filter as set forth in claim 1 which includes:

a tubular housing positioned in surrounding relation with said filter element, said housing having a cylindrical open upper end portion and an elongated frusto-conical open lower end portion, and said cap positioned within said housing upper end portion.

3. An air filter as set forth in claim 2 which includes:

a fastening mechanism for attaching said housing to said base to permit ease of access to said filter element.

4. An air filter as set forth in claim 2 which includes:

means for releasably attaching said housing to said base for installation and removal of said filter element relative to said base.

5. An air filter as set forth in claim 2 in which:

said tubular housing includes a cylindrical upper section, a conical lower section increasing in diameter from adjacent to said upper section to a lower end forming a truncated cone, and a cylindrical transition section connecting said upper section to said lower section, said lower section lower end supported by said base, and an end portion of said cap projecting into said upper section with said cap turbine blades positioned within said transition section.

6. An air filter as set forth in claim 2 which includes:

a flange extending radially on said base between said base enlarged end portion and said base reduced end portion, said flange having a peripheral recess, and said tubular housing supported by said base flange in said peripheral recess to axially mount said tubular housing on said base to coaxially position said tubular housing and said filter element.

7. An air filter as set forth in claim 1 in which:

said filter element open lower end portion includes a resilient collar extending from said filter element, said base open enlarged end portion extending into frictional engagement with said collar, and said clamping means circumscribing said collar and said base open enlarged end portion to sealingly engage said filter element to said base.

8. An air filter as set forth in claim 1 which includes:

said channels of said cap being angularly displaced from a longitudinal axis of said cap to create a spiral flow of contaminated air into said filter element.

9. An air filter as set forth in claim 1 in which:

said air permeable filter material includes a sheet of pleated material forming a plurality of spaced apart rows extending longitudinally from said cap to said filter element open enlarged end portion, and said cap channels being angularly displaced from said rows.

10. An air filter assembly comprising:

a filter element formed of an air permeable material, said filter element having a conical-shaped body portion with an upper end portion closed by a cap and an open lower end portion, a resilient collar extending axially from said filter element open lower end portion, a cylindrical base member having an inlet end portion and an outlet end portion with a radial portion positioned intermediate said inlet and outlet end portions, said base member inlet end portion extending into sealing engagement with said collar to axially position said filter element on base member, a housing surrounding said filter element, said housing having a cylindrical open upper end portion and an elongated frusto-conical body portion, and said housing body portion having a lower end positioned on said base member radial portion to axially position said housing on said base member and thereby coaxially align said housing and said filter element to assure uniform spacing between said housing and said filter element the length of said filter element in said housing for the flow of air into said housing and through said filter element.

11. An air filter assembly as set forth in claim 10 in which:

said resilient collar is fabricated of a sound absorbing material, said collar extending from said filter element lower end portion, and said collar compressed onto said base member inlet end portion to absorb vibration of said base member and abate noise generated by the flow of air through said filter element.

12. An air filter assembly as set forth in claim 10 which includes:

a hose clamp surrounding said collar to compress said collar on said base member to sealingly connect said filter element to said base member.

13. An air filter assembly as set forth in claim 10 in which:

said base member radial portion has a peripheral edge and an annular groove, said peripheral edge extending upwardly from said annular groove, and said housing body portion lower end received in said annular groove to position said housing on said base member in axial alignment with said filter element connected to said base member.

14. An air filter assembly as set forth in claim 10 in which:

said base member inlet end portion extends into frictional engagement with said collar, and a hose clamp surrounding said collar to compress said collar into sealing engagement with said base member inlet end portion to connect said filter element to said base member.

15. An air filter assembly as set forth in claim 10 in which:

said collar is compressed onto said base member to absorb vibration of said base member generated by the flow of air through said filter element and abate the noise resulting therefrom.

16. An air filter assembly as set forth in claim 10 in which:

said cap has a conical configuration with a plurality of turbine blades extending in spaced relation on the surface of said cap to form channels between said turbine blades for accelerating the flow of air into contact with said filter.

17. An air filter assembly as set forth in claim 10 in which:

said cap is fabricated of a resilient material.

18. An air filter assembly as set forth in claim 10 in which:

said filter element has a pleated conical construction fabricated of a woven material, said cap attached to upper ends of said pleats, and said collar attached to lower ends of said pleats.

19. An air filter assembly as set forth in claim 18 in which:

said woven material is selected from a group consisting of cotton.

20. A method for assembling an air filter comprising the steps of:

supporting a lower end portion of a conical filter element on a cylindrical base, clamping the filter element to the base to maintain the filter element in axial alignment with the base, positioning a conical housing having opposite open end portions in surrounding relation with the filter element, positioning a large diameter end portion of the housing on the base in surrounding relation with the filter element secured to the base, and securing the housing to the base so that the housing is axially aligned with the base to coaxially position the housing and the filter element to maintain uniform spacing between the housing and the filter element for the flow of air into the housing and through the filter.

21. A method as set forth in claim 20 which includes:

accelerating the flow of air through an upper open end portion of the housing into contact with the filter, and deflecting the accelerated air flow in the housing into contact with the filter.

22. A method as set forth in claim 20 which includes:

securing a cap fabricated of resilient material to an upper end portion of the filter element, and securing a collar fabricated of resilient material around a lower end portion of the filter element.

23. A method as set forth in claim 22 which includes:

clamping the collar into surrounding sealing relation with the base to provide an airtight connection of the filter to the base.

24. A method as set forth in claim 20 which includes:

releasably connecting the housing to the base to permit movement of the housing between a first position removed from the base to expose the filter and a second position supported by the base in coaxial alignment with the filter.

25. A method as set forth in claim 20 which includes:

releasably clamping the housing to the base to permit movement of the housing into and out of coaxial position with the filter element.

* * * * *